(12) United States Patent
Lollini et al.

(10) Patent No.: US 8,966,904 B2
(45) Date of Patent: Mar. 3, 2015

(54) ARCHITECTURE FOR FEEDING FUEL TO A POWER PLANT FOR DRIVING A ROTARY WING OF A ROTORCRAFT

(75) Inventors: Lionel Lollini, Montvendre (FR); Damien Morizot, Ensues la Redonne (FR)

(73) Assignee: Airbus Helicopters, Marignane Cedex (FR)

( * ) Notice: Subject to any disclaimer, the term of this patent is extended or adjusted under 35 U.S.C. 154(b) by 365 days.

(21) Appl. No.: 13/590,531

(22) Filed: Aug. 21, 2012

(65) Prior Publication Data

US 2013/0213044 A1    Aug. 22, 2013

(30) Foreign Application Priority Data

Sep. 9, 2011 (FR) ...................... 11 02736

(51) Int. Cl.
  *F02C 7/22* (2006.01)
  *F02C 7/236* (2006.01)
  *B64D 37/00* (2006.01)
  *B64D 37/04* (2006.01)
  *B64D 37/14* (2006.01)

(52) U.S. Cl.
  CPC . *F02C 7/22* (2013.01); *F02C 7/236* (2013.01); *B64D 37/00* (2013.01); *B64D 37/04* (2013.01); *B64D 37/14* (2013.01)
  USPC .......................................................... 60/734

(58) Field of Classification Search
  CPC ............ F02C 7/236; F02C 7/22; F02C 7/228; B60K 15/00; B60K 15/03
  USPC ............... 60/39.094, 734; 244/172.2, 172.3, 244/135 R, 135 C, 53 R, 55, 58, 60, 129.1; 137/565.22, 565.34, 264, 265
  See application file for complete search history.

(56) References Cited

U.S. PATENT DOCUMENTS

| 3,275,061 A * | 9/1966 | Williams et al. ............... 137/263 |
| 5,660,358 A * | 8/1997 | Grafwallner et al. ..... 244/135 R |
| 2010/0051749 A1 | 3/2010 | Tanner |
| 2012/0111417 A1 | 5/2012 | Smith |

FOREIGN PATENT DOCUMENTS

| EP | 0670264 A1 | 9/1995 |
| EP | 2074027 A1 | 7/2009 |
| FR | 2623774 A1 | 6/1989 |
| WO | 2009139801 A2 | 11/2009 |

OTHER PUBLICATIONS

Search Report and Written Opinion; Application No. FR 1102736; dated Apr. 12, 2012.

\* cited by examiner

*Primary Examiner* — Phutthiwat Wongwian
*Assistant Examiner* — Thomas Burke
(74) *Attorney, Agent, or Firm* — Brooks Kushman P.C.

(57) ABSTRACT

An architecture for feeding fuel to a power plant (1) of a rotorcraft, which power plant comprises a plurality of engines (2, 3) individually fed with fuel by respective assemblies (4, 5). Each assembly (4, 5) comprises a fuel feed circuit (9, 10) for feeding a safe tank (6, 7) from a fuel tank (8) that is common to the assemblies (4, 5). Together the feed circuits (9, 10) form a circuit for forced both-way transfer of fuel from either one of the assemblies to the other via the common tank (8) and an intercommunication (21) interposed between the safe tanks (6, 7), which safe tanks are fitted with respective spillage devices (17, 18, 19, 20) for transferring excess fuel to the common tank (8).

12 Claims, 1 Drawing Sheet

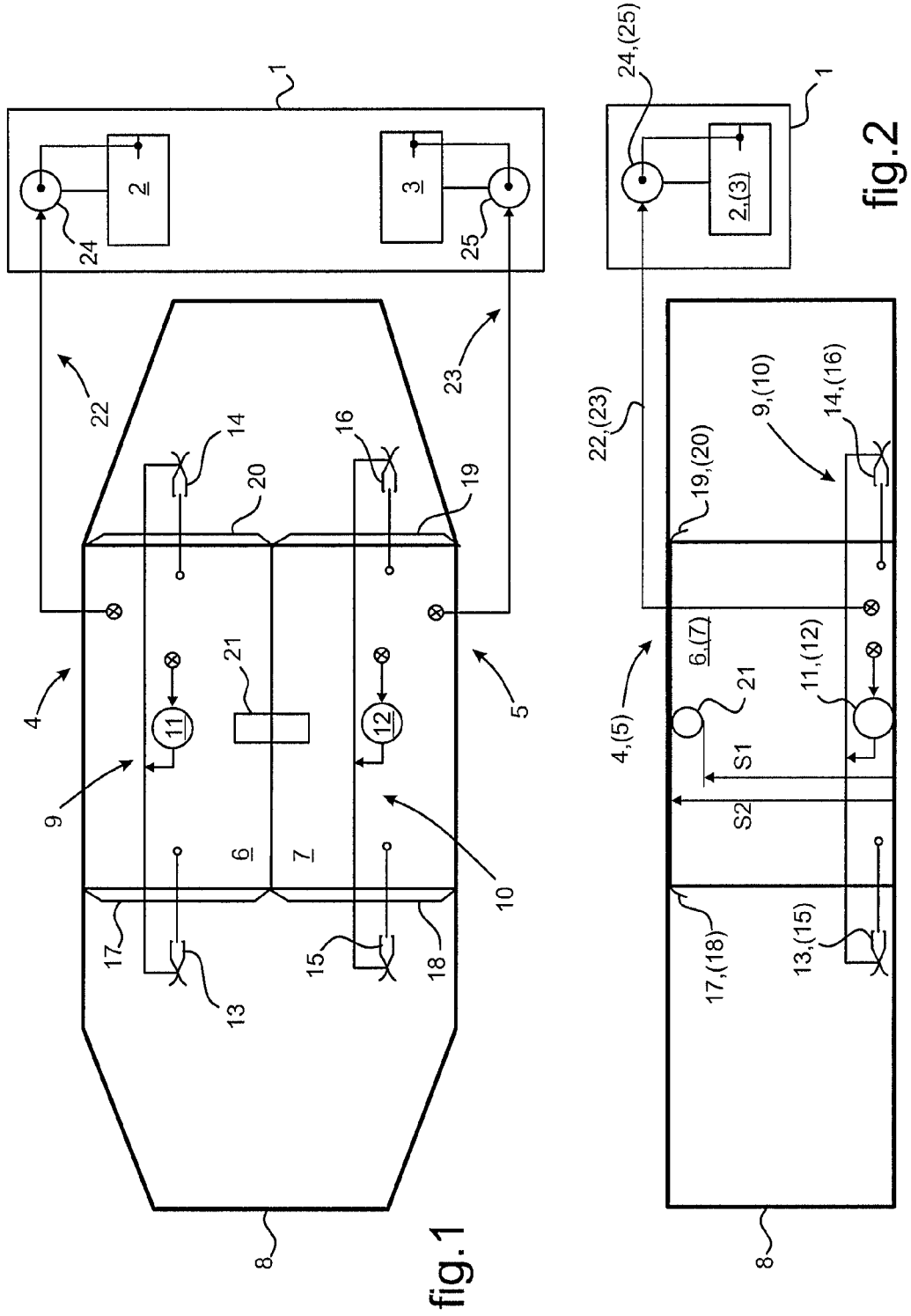

ARCHITECTURE FOR FEEDING FUEL TO A POWER PLANT FOR DRIVING A ROTARY WING OF A ROTORCRAFT

CROSS REFERENCE TO RELATED APPLICATIONS

The present application claims priority to French patent application FR 11/02736 filed on Sep. 9, 2011, the disclosure of which is incorporated in its entirety by reference herein.

BACKGROUND OF THE INVENTION (1) Field of the Invention

The present invention relates to the field of rotorcraft having a power plant comprising a plurality of engines, which engines are used selectively for driving at least one rotary wing of the rotorcraft in rotation.

The present invention relates more particularly to rotorcraft arrangements relating to feeding such a power plant with fuel. A particular object of the present invention is to provide an architecture for feeding fuel to a power plant fitted to a rotorcraft, which power plant has a plurality of engines, and in particular two engines, and serves to drive the rotary wing in rotation selectively from one and/or the other of the engines.

(2) Description of Related Art

Rotorcraft are aircraft in which lift, and possibly also propulsion and maneuvering in flight, are obtained by means of at least one rotary wing forming part of a rotorcraft. The rotary wing is driven in rotation at a speed that is generally constant by a power plant, and it comprises blades that can be operated by actuators in order to vary their pitch collectively and/or cyclically. Varying the pitch of the blades serves to provide the rotorcraft with propulsion and/or maneuvering in flight. The rotary wing may equally well be a main rotary wing providing at least the lift if not also the propulsion of the rotorcraft, a propulsive propeller in a hybrid helicopter, for example, or a rotary tail wing that serves to provide yaw maneuvering for the rotorcraft. In order to limit the number of on-board engines included in the power plant, it is common practice to use a single power plant to drive the various rotary wings of the rotorcraft in rotation.

Rotorcraft are commonly arranged in various categories, depending on the architecture of their power plants and more particularly as a function of the safety provided by the power plant when faced with a possible failure. One distinction between two categories of rotorcraft is associated in particular with their ability to fly safely over various kinds of territory, especially in the event of a possible failure of the power plant.

By way of example, rotorcraft of category A are rotorcraft in which the power plant has a plurality of engines, and in particular two engines, which engines serve to drive at least the main rotary wing. In the event of a first engine failing, a second engine must be capable of being used to enable the rotorcraft to continue flying, possibly so as to move away from sensitive territory, such as a densely populated area, for example.

Rotorcraft of category A should be distinguished in particular from rotorcraft of category B of organization that does not satisfy such requirements for safely overflying sensitive territory. Rotorcraft of category B may have one or more engines, but their ability to continue flying in the event of an engine failure does not comply with constraints relating to satisfying regulations for overflying sensitive territories.

With rotorcraft of category A, there arises a problem of organizing how to feed fuel to the various engines making up the power plant. Account must be taken of the constraints to which rotorcraft of category A are subjected for overflying sensitive territory. The architecture for feeding fuel to the power plant fitted to a rotorcraft of category A is more complicated than for rotorcraft of category B, since each engine of the power plant must be capable of being fed with fuel for a determined duration in the event of the other engine failing.

Traditionally, the fuel feed architecture of a power plant fitted to a rotorcraft of category A has fuel feed assemblies that are allocated respectively to each of the engines in order to enable them to operate selectively and independently.

Each assembly comprises a fuel tank and a safe tank containing some minimum quantity of fuel.

The fuel tank may have a single compartment or it may be constituted by a plurality of compartments that are in free fluid-flow communication with one another. Such free fluid-flow communication naturally achieves spontaneous balancing due to gravity one with the other of the compartments, for the quantity of fuel contained in each of them. The safe tank is formed by an enclosure that is independent from free fluid-flow communication of fuel, at least from the fuel tank to the safe tank.

The safe tank has a capacity that must enable the corresponding engine to be supplied with a safe quantity of fuel. The safe quantity of fuel corresponds to supplying the engine with sufficient fuel to ensure that in the event of a rotorcraft failure it can continue to fly for some minimum length of time that is set by regulations. As an indication, such a duration for continued flying is of the order of twenty minutes, corresponding to the rotorcraft being able to fly far enough away from the territory that is considered to be sensitive.

The engine is in fluid-flow communication with the safe tank included in the assembly allocated thereto via a circuit for supplying fuel from the safe tank to the engine. The supply circuit includes a pair of booster pumps that dip into the safe tank, one of the booster pumps taking over from the other booster pump in the event of a failure. In order to guarantee that the engine is supplied with fuel in the event of both booster pumps failing, the supply circuit also includes a supply pump that is driven by the engine.

Each safe tank is fed with fuel from the fuel tank of the corresponding assembly via a feed circuit that includes feed pumps housed inside the safe tank. It is necessary to make the feeding of fuel to the safe tank secure, and, as for the booster pumps, the feed pumps are two in number, with one taking over from the other in the event of a failure.

In order to avoid redundancy of the pumps located inside the safe tank, it is common practice to use the booster pumps to act as the feed pumps. The feed circuit includes one ejector per compartment for trapping fuel and delivering it to the corresponding safe tank. The ejector, or an analogous member for capturing and delivering a fluid inside a fluid flow circuit, is an item that is common in the field of feeding fuel to a power plant fitted to a rotorcraft. From a flow of fluid inside the feed circuit, which flow is in particular forced by one of the booster pumps forming a feed pump, the ejector causes the fuel contained in the corresponding compartment to be delivered to the safe tank.

Since the capacity of the safe tank is limited, although not less than that which is necessary for continued flight in the event of a failure of the rotorcraft, the safe tank is fitted with an excess fuel device that returns the excess fuel from the safe tank by overflow to the fuel tank.

The overall supply of fuel on board the rotorcraft is stored inside the tanks of the various assemblies. A fuel transfer circuit is interposed between the fuel tanks and includes a transfer pump that can rotate in both directions and that causes fuel to flow selectively from either one of the fuel tanks to the other. Fuel is transferred from either fuel tank towards the other, being delivered to the bases of the safe tanks.

The transfer circuit enables the quantity of fuel to be balanced from either one of the circuits to the other. Such balancing is useful for distributing the weight of fuel on the rotorcraft. The transfer circuit also makes it possible, in particular in the event of one of the engines failing, to make use of all of the on-board fuel that can be consumed. The safe tanks are kept fed so long as all of the on-board fuel has not been consumed.

An intercommunication circuit is also provided that is arranged between the fuel tanks and that is arranged as a spillway. The intercommunication circuit is in free fluid-flow communication with each of the fuel tanks, in their top portions relative to gravity, so as to allow fuel to escape from either one of the fuel tanks to the other in the event of there being excess fuel in one of them.

In the field of aviation, airplanes are also subjected to the constraints of aircraft of category A relating to the ability to continue flying for a determined duration, as mentioned above. The arrangement of an architecture for feeding fuel to the engines of an aircraft is closely linked with the specific organization of the aircraft. By way of example, such an architecture must take account of the ways in which the aircraft is supported and propelled in flight, and of the surroundings available for receiving and interconnecting the various members and fuel-conveying circuits that are included in the architecture.

Nevertheless, in order to refer to a technological environment relating to the structural members included in an architecture for feeding fuel in aircraft, reference may be made for example to the following documents: US 2010/051749 (Tanner R. B.); U.S. Pat. No. 3,275,061 (Williams R. L. et al.); FR 2 623 774 (Aerospatiale); EP 2 074 027 (Boeing Co.); or EP 0 670 264 (Daimler Benz Aerospace AG, Tupolev AG); or indeed to the following document U.S. Pat. No. 3,275,061 (Williams R. L. et al.). Reference may also be made to document WO 2009/139801 (Sikorsky Aircraft Corp.) which describes a fuel feed architecture for a rotorcraft having a power plant including a pair of engines.

It is found that the conventional architectures for feeding fuel to the power plant of rotorcraft of category A would benefit from being simplified. Such simplification would need to be obtained without losing sight of the constraints to which rotorcraft of category A are subjected, in particular with respect to rules concerning continuing flight in the event of one of the engines of the power plant failing.

BRIEF SUMMARY OF THE INVENTION

The object of the present invention is to propose an architecture for feeding fuel to a power plant of a rotorcraft that has a plurality of engines. The architecture of the present invention is more particularly of the type that is organized, in the event of a failure of one of the engines, to ensure that flight can be continued safely in the manner required for rotorcraft of category A, as mentioned above.

The present invention seeks more particularly to provide such an architecture of structure that is simple, without that simplification degrading the safety conditions required for enabling flight to be continued in the event of one of the engines of the rotorcraft failing. Such safety conditions imply in particular an ability to supply fuel to the engines that is distinct for each of the engines, and that enables an engine to be kept individually in operation for some minimum duration that is sufficient to enable the rotorcraft to leave the sensitive territory in the event of one of its engines failing.

The present invention relates to rotorcraft equipment constituted by an architecture for feeding fuel to a power plant. The power plant has a plurality of engines that are organized to drive at least one given rotary wing of the rotorcraft in rotation. The rotary wing is at least a rotary wing of a main rotor and/or of a tail rotor of the rotorcraft, or indeed a propulsive propeller of the type fitted to a hybrid helicopter, for example. The engines in the power plant are organized to act together to drive the rotary wing, with one of the engines taking over from the other in the event of said other engine failing.

The architecture for feeding fuel to the power plant comprises fuel feed assemblies that are allocated to supplying fuel to respective engines. Each assembly includes a fuel tank and a safe tank.

The fuel tank houses a supply of fuel on board the aircraft for supplying to at least one of the engines of the power plant. A transfer circuit, as described below, is advantageously used for enabling all of the on-board fuel to be consumed by transferring fuel from either one of the assemblies to the other.

The safe tank is an enclosure of limited capacity that is suitable for containing a quantity of fuel that is sufficient to enable the rotorcraft to continue flying in the event of a failure so as to move away during a predetermined duration from a sensitive territory over which it might be flying. The safe tank is fed with fuel from the fuel tank by a fluid-flow feed circuit that conveys fuel from the fuel tank to the safe tank.

The feed circuit includes at least one feed pump that dips into the safe tank and at least one ejector that dips into the fuel tank. The feed pump causes fuel to flow within the feed circuit, with the safe tank being fed with fuel from fuel that is captured and delivered by the ejector in the feed circuit from the fuel tank to the safe tank.

The flow of fluid admitted into the safe tanks by means of the feed circuit is greater than the flow of fuel that is needed for supplying the engine with fuel. In order to certify such supply, it is necessary to evacuate the surplus fuel admitted into the safe tank from the fuel tank. For this purpose, the safe tank is provided with a spillage device, thereby spontaneously emptying out excess fuel that has been admitted into the safe tank via the feed circuit from the fuel tank.

The architecture for feeding fuel to the power plant also includes a circuit for supplying fuel from the safe tank to the engine with which the assembly is associated. The supply circuit includes at least one supply pump that causes fuel to flow in the supply circuit from the safe tank to the engine. As mentioned above, the flow rate of the supply pump is less than the flow rate at which fuel is fed to the safe tank from which the corresponding engine is supplied with fuel.

The architecture for feeding fuel to the power plant also includes intercommunication arranged as a spillway. The intercommunication is arranged between the assemblies, in the top portions of the assemblies relative to gravity. The intercommunication forms a spillway for excess fuel from either one of the assemblies to the other.

The architecture for feeding fuel to the power plant also includes a circuit for forced transfer of fuel from either one of the assemblies to the other. The transfer circuit includes at least one transfer pump that can drive fuel in both directions, selectively from either one of the assemblies to the other. The transfer circuit causes fuel to flow from a first assembly to a second assembly in a first fuel flow direction, and from said second assembly to said first assembly in a second fuel flow direction opposite to the first.

The transfer pump is constituted by at least one member for capturing and delivering fuel from either one of the assemblies to the other so as to balance the quantity of fuel that each of the assemblies contains respectively. The transfer pump is organized in such a manner that the fuel can be conveyed via the transfer circuit selectively from either one of the assemblies to the other as a function of requirements for achieving the desired fuel balancing.

According to the present invention, the rotorcraft equipment constituted by the architecture for feeding fuel to the power plant of a rotorcraft, as described above, is mainly recognizable in that the fuel tank included in each of the assemblies is formed by at least one fuel tank that is common to both assemblies. Such a common fuel tank may have one or more compartments in free fluid-flow communication, the fuel being contained in a common volume in free fluid-flow communication for both of the assemblies. The ejectors of the feed circuits included respectively in each of the assemblies dip into the inside of said common tank. Each of the circuits for feeding fuel to each of the safe tanks included respectively in the assemblies takes fuel individually from the common fuel tank, for the purpose of feeding each of the safe tanks with fuel.

Each of the engines has its own safe tank, which safe tank is fed individually with fuel by the feed circuit associated therewith. Each of the engines may be individually supplied with fuel from its safe tank throughout the predetermined duration for continued flight. In the event of a failure of one of the engines, the other engine has individually available thereto, from its associated safe tank, at least the quantity of fuel that is needed to enable the rotorcraft to continue the flight for at least the predetermined continued flight duration. The architecture for feeding fuel to the power plant complies in satisfactory manner to the safety constraints that apply to rotorcraft of category A.

Arranging the fuel tanks included in the respective assemblies as a common tank breaks with convention in the field of rotorcraft concerning how to provide individual fuel supplies in rotorcraft of category A. While achieving the same safety conditions for overlying sensitive territory, redundancy of the pumps and complexity of the various circuits in the architecture are avoided.

Broadly speaking, the inventive approach of the present invention of putting the fuel tanks in common is accompanied by merging the respective functions performed by the pumps respectively implemented in the feed circuit and the transfer circuit. Putting the fuel tanks in common is also accompanied by making use of the intercommunication in order to keep each of the safe tanks fed permanently, even in the event of a feed pump failing, it being advantageously desirable for there to be only one feed pump for each assembly.

The intercommunication is positioned in particular between the assemblies via the safe tanks that the intercommunication puts into mutual fluid-flow communication. Each of the feed pumps is used individually so that together they form the transfer pump, operating in respective fluid-flow directions between the assemblies. A failure of a feed pump makes it impossible to transfer fuel from one of the assemblies to the other in the corresponding flow direction. In the event of a feed pump failing, the intercommunication allows the corresponding safe tank to be forcibly filled with fuel from the other safe tank, which is fed with fuel by the feed pump associated therewith. Under such circumstances, in the event of one of the feed pumps failing, the fuel feed capacities of each of the safe tanks via the feed circuits that are respectively associated therewith advantageously make it possible to feed the corresponding safe tank with fuel from the other safe tank via the intercommunication. The other safe tank then constitutes an auxiliary fuel feed source for the safe tank with the failed feed pump, in the direction that corresponds to transferring fuel from one assembly to the other via the intercommunication.

More particularly, the feed circuits included respectively in each of the assemblies together form the transfer circuit via the common fuel tank. The feed pumps included respectively in the feed circuits of each of the assemblies together form the transfer pump for causing fuel to flow selectively in both directions from either one of the assemblies to the other.

Each of the ejectors included respectively in the assemblies draws fuel from inside the common fuel tank for the purpose of feeding that one of the safe tanks with which it is associated. The common fuel tank forms a member that is involved in the transfer circuit, providing a capacity for putting the safe tanks into fluid-flow communication with each other via the respective feed circuits that are associated with them.

The safe tanks included respectively in each of the assemblies are enclosures that are distinct from each other concerning free fluid-flow communication, at least in the direction for conveying fuel from the fuel tank to the safe tanks. The feed pumps drive a forced flow of fuel from either one of the assemblies to the other, and more particularly a forced flow of fuel from either one of the safe tanks to the other in the respective fuel flow directions from either one of the safe tanks to the other.

Still more particularly, the intercommunication is provided by being interposed between the safe tanks included respectively in each of the assemblies. The intercommunication forms a spillway for excess fuel from either one of the safe tanks to the other under the effect of fuel flowing via the intercommunication as forced by the fuel feed pumps fitted respectively to each of the safe tanks. The intercommunication advantageously leads to the insides of each of the safe tanks, in the top portions of the safe tanks and upstream from the spillage devices that are included respectively in each of the safe tanks. The concepts of "top" and "upstream" should be considered relative to the direction in which fuel rises inside the safe tanks from their bottoms.

The intercommunication and the spillage devices included respectively in each of the safe tanks advantageously together make up means for removing excess fuel from the safe tanks in compliance with two respective thresholds for removal of excess fuel from the safe tanks. A first threshold corresponds to a minimum quantity of fuel contained individually inside each of the safe tanks. A second threshold corresponds to fuel that is in excess compared with a maximum quantity of fuel that the safe tanks can contain respectively.

The second threshold, which comes after the first in the direction of fuel rising in the safe tanks from their bottoms, corresponds to the intercommunication function enabling excess fuel to spill from either one of the assemblies to the other. Such a function is obtained not only by the intercommunication, but also by means of respective spillway devices included in each of the safe tanks.

It should be considered that the intercommunication contributes to the transfer circuit by providing a spontaneous transfer of excess fuel from either one of the safe tanks to the other in the event of a feed pump failing. The distinction of volume containing fuel in each of the assemblies corresponds to the distinction of the volumes of the safe tanks, plus the volume of the corresponding feed circuit.

Since the fuel tank is common to both assemblies, fuel transfer does not take place from one of the respective fuel tanks of the assemblies to the other, but rather from one of the safe tanks to the other. The feed pumps serve to transfer fuel from one of the assemblies to the other, and more particularly, from one of the safe tanks to the other, in a first fuel transfer function. The intercommunication serves to transfer fuel from one of the assemblies to the other, and more particularly from one of the safe tanks to the other, in the opposite other direction of fuel transfer under the effect of the forced driving of fuel by the corresponding feed pump.

It is possible to avoid using redundancy of the feed/transfer pumps housed in a given safe tank for the purpose of making the feed circuit and the transfer circuit safe. The fuel feed pump of one of the safe tanks constitutes a safety substitute pump for the other fuel feed pump of the other safe tank, in the event of said other feed pump failing.

It should be considered that the intercommunication advantageously forms a member for spontaneously feeding either one of the safe tanks in the event of the fuel feed pump included in the feed circuit of that safe tank failing. It should also be considered that it is preferable for there to be a single feed pump for each of the assemblies, and that the feed circuits of each of the safe tanks are of a capacity that is adapted to feeding both safe tanks simultaneously.

The capacity of the safe tanks is appropriate for being strictly limited to the volume of fuel needed for maintaining the corresponding engine in operation for the predetermined duration of continued flight. This is achieved by the feed pumps being associated with each other so as to form a transfer pump, and by the intercommunication relative to the first fuel spillage threshold between the safe tanks. This is achieved including while taking account of the ability of each of the safe tanks to be fed with fuel while using only one feed pump of flow rate capacity that is appropriate for feeding both safe tanks simultaneously.

Since the safe tanks are housed in particular inside the fuel tank, their outside volumes and overall bulk are kept as small as possible. This enhances the freedom with which the common fuel tank in the rotorcraft architecture can be arranged. The number of pumps needed for operating the architecture for feeding fuel to a power plant of a rotorcraft of category A is limited by being reduced to only two pumps, respectively constituting one and the other of the feed pumps, which number of pumps is preferably increased by the supply pumps.

In order to improve the reduction in the number of pumps included in the architecture, the supply pumps are preferably reduced to no more than the pumps that are conventionally incorporated in the power plant and that are driven by the corresponding engines.

More particularly, in an embodiment, at least one of the feed pumps may be a booster pump, forming a fuel supply pump for the corresponding engine.

Nevertheless, an embodiment is preferred in which a pump of the power plant that is driven by at least one of any one of the corresponding engines forms a fuel supply pump for that engine.

The arrangement of the common fuel tank is easily adaptable to the specific architecture of the rotorcraft that receives the architecture for feeding fuel to the power plant that it includes. In variant embodiments, the common fuel tank may constitute a single compartment or it may be made up of a plurality of compartments that are mutually in free fluid-flow communication. The safe tanks are preferably installed inside the same compartment, in order to make it easier to organize the intercommunication.

More particularly, and in an embodiment, the common fuel tank has a single compartment that houses both safe tanks included respectively in each of the assemblies.

In another embodiment, the common fuel tank is made up of a plurality of compartments that are mutually in free fluid flow communication. At least one of any one of the compartments making up the common fuel tank houses at least one of the safe tanks included in at least one of the assemblies.

For example, and preferably, the safe tanks are housed together in a single compartment of the common fuel tank. A compartment making up the common fuel tank houses both of the safe tanks included respectively in each of the assemblies so as to make it easier to install the intercommunication between the safe tanks.

Alternatively, by way of example, a first compartment houses a first safe tank and another compartment houses the other safe tank. The two compartments are nevertheless placed close together so as to make it easier to install the intercommunication between the safe tanks.

The present invention also provides a rotorcraft fitted with a power plant having a plurality of engines that are fed with fuel from a fuel feed architecture as described above.

The rotorcraft has a power plant comprising a plurality of engines, in particular two engines. The rotorcraft is a rotorcraft of category A that complies with regulations concerning overflying sensitive territories, whereby in the event of one of the engines failing, or in the event of any one member of the rotorcraft failing, the rotorcraft is capable of continuing its flight for a predetermined duration.

Each of the engines of the rotorcraft is fed independently with fuel from the safe tank that is respectively associated therewith. The safe tanks are fed with fuel by the feed circuits that are respectively specific thereto from a common fuel tank. The fuel feed circuit of a safe tank constitutes a circuit for feeding fuel to the other safe tank in the event of a failure of the feed circuit of that other safe tank, fuel passing via the intercommunication that forms part of the circuit for forced transfer of fuel from either one of the assemblies that include the respective safe tanks to the other assembly.

BRIEF DESCRIPTION OF THE SEVERAL VIEWS OF THE DRAWINGS

An embodiment of the present invention is described below with reference to the figures of the accompanying sheet, in which:

FIG. 1 is a diagrammatic illustration of rotorcraft equipment of the present invention constituted by an architecture for feeding fuel to a power plant having two engines and forming part of the rotorcraft; and FIG. 2 is a diagram of one of the assemblies included in the equipment shown in FIG. 1. The assembly shown in FIG. 2 being similar to the other assembly, references in FIG. 2 that correspond to analogous members of the other assembly are mentioned by way of example in parentheses.

DETAILED DESCRIPTION OF THE INVENTION

In the figures, rotorcraft equipment is constituted by an architecture for feeding fuel to a power plant 1. The power plant 1 is dedicated to driving at least one rotary wing of the rotorcraft in rotation, and it comprises two engines 2, 3. In the event of one or other of the engines 2, 3 failing, the other engine 2, 3 takes the place of the failed engine 2, 3 in order to continue driving rotation of the rotary wing during some predetermined minimum duration.

The engines 2, 3 are individually fed with fuel from fuel feed assemblies 4, 5 that are respectively allocated to each of them. Each assembly 4, 5 includes a safe tank 6, 7 of capacity corresponding to the amount of fuel needed to feed the corresponding engine 2, 3 with fuel for the predetermined minimum duration. Both safe tanks 6, 7 are housed in a common tank 8, which contains all of the supply of fuel on board the rotorcraft. The safe tanks 6 and 7 are individually fed with fuel from the common tank 8 via feed circuits 9, 10 that are respectively allocated to each of the safe tanks 6, 7.

Each feed circuit 9, 10 comprises a feed pump 11, 12 and at least one ejector 13, 14, 15, 16. In the embodiment shown, each feed circuit 9, 10 has a pair of ejectors 13, 14 and 15, 16 that dip respectively into front and rear zones of the common tank 8. The concept of front and rear should be considered relative to the position the common tank 8 is installed on board a rotorcraft. The feed pumps 11, 12 dip respectively into the bottoms of corresponding safe tanks 6, 7, and the ejectors 13, 14, 15, 16 dip into the bottom of the common tank 8. Each safe tank 6, 7 is provided with a spillage device 17, 18, 19, 20 that enables it spontaneously to return any excess fuel in the safe tanks 6, 7 to the common tank 8 by overflow.

The safe tanks 6, 7 are in communication with each other via an intercommunication 21 that is positioned in the top portions of the safe tanks 6, 7 and upstream from the spillage devices 17, 18, 19, 20 that the safe tanks include. The upstream position of the intercommunication 21 should be considered relative to the direction in which fuel rises inside the safe tanks 6, 7 from their bottoms up to the corresponding spillage devices 17, 18, 19, 20.

In FIG. 2, the upstream position of the intercommunication 21 determines the individual capacity of each safe tank, which capacity is relative to a first capacity threshold S1. This first capacity threshold S1 corresponds to the minimum quantity of fuel needed for feeding the corresponding engines 2, 3 with fuel so as to enable it to be kept in operation for the predetermined minimum duration. This first threshold S1 corresponds to the threshold from which the intercommunication 21 is used to transfer excess fuel spontaneously from one assembly 4, 5 to the other, under the effect of a forced flow of fuel that is driven in particular by one of the feed pumps 11, 12 in the event of the other feed pump 11, 12 failing. Each of the safe tanks 6, 7 can be fed with fuel via the intercommunication 21 from the other safe tank 6, 7, from the source formed by the common tank 8.

The spillage devices 17, 18, 19, 20 are placed in a position downstream from the intercommunication 21, determining the individual capacity of each safe tank 6, 7, which capacity is relative to a second capacity threshold S2. This second capacity threshold S2 corresponds to the total capacity of the safe tanks beyond which fuel is restored to the common tank 8.

Each safe tank 6, 7 has a pair of excess fuel emptying means. A first emptying means is formed by the intercommunication 21 at a first emptying threshold S1 to one or the other of the safe tanks 6, 7. This first emptying threshold S1 is used as the minimum fuel capacity limit that each safe tank 6, 7 is suitable for containing, and as a filling threshold for filling one of the safe tanks 6, 7 from the other 6, 7 in the event of a failure of the feed pump 11, 12 with which the other safe tank 6, 7 is fitted. Second emptying means are formed by the spillage devices 17, 18, 19, 20 included in the safe tanks 6, 7 and located at a second emptying threshold S2 for passing fuel from the safe tanks 6, 7 to the common tank 8, with this being allowed only when both of the safe tanks 6, 7 are being kept full.

In the figures, the engines 2, 3 are individually fed with fuel from that one of the safe tanks 6, 7 that is associated therewith via corresponding supply circuits 22, 23. Each supply circuit 22, 23 has a supply pump 24, 25 that is driven by the corresponding engine and it collects the fuel used individually by the engines 2, 3 from the bottoms of the safe tanks 6, 7.

What is claimed is:

1. Rotorcraft equipment constituted by an architecture for feeding fuel to a power plant comprising a plurality of engines for driving at least one rotary wing of the rotorcraft in rotation, the architecture comprising:
   fuel feed assemblies that are allocated to supplying fuel to respective engines;
      each assembly comprising a fuel tank and a safe tank that is fed with fuel from the fuel tank by a feed circuit;
      the feed circuit including at least one feed pump dipping into the safe tank and at least one ejector dipping into the fuel tank, the feed pump taking fuel from capture and delivery of the fuel by the ejector, and driving the fuel into the feed circuit so that it flows from the fuel tank towards the safe tank; and
      the safe tank being provided with a spillage device enabling excess fuel therein to be emptied spontaneously therefrom;
   a supply circuit for supplying fuel from the safe tank to the engine with which the assembly is associated, the supply circuit including at least one supply pump that causes fuel to flow within the supply circuit from the safe tank to the engine;
   an intercommunication that is interposed between the assemblies and that forms an excess fuel spillway from one of the assemblies to the other; and
   a transfer circuit for forced transfer of fuel from one of the assemblies to the other, the transfer circuit including at least one transfer pump for delivering both-way flow of fuel selectively from one of the assemblies to the other;
   wherein the fuel tank included in each of the assemblies is at least one tank common to both assemblies, the ejectors of the feed circuits included in each of the assemblies dipping into the common tank.

2. Rotorcraft equipment according to claim 1, wherein the feed circuits included respectively in each of the assemblies together form the transfer circuit via the common tank, the feed pumps included respectively in the feed circuits of each of the assemblies together forming the transfer pump for driving both-way flow of fuel selectively from either one of the assemblies to the other.

3. Rotorcraft equipment according to claim 1, wherein the intercommunication is interposed between the safe tanks included respectively in each of the assemblies, forming an excess fuel spillway from one of the safe tanks to the other.

4. Rotorcraft equipment according to claim 3, wherein the intercommunication leads to the insides of both of the safe tanks in the top portions of the safe tanks and upstream from spillage devices included respectively in each of the safe tanks.

5. Rotorcraft equipment according to claim 1, wherein the intercommunication forms a member for spontaneously feeding either one of the safe tanks in the event of a failure of the fuel feed pump included in the feed circuit allocated to that safe tank.

6. Rotorcraft equipment according to claim 5, wherein there is a single feed pump for each of the assemblies, the feed circuit of each of the safe tanks being of a capacity that is adapted to feeding both safe tanks simultaneously.

7. Rotorcraft equipment according to claim 1, wherein at least one of the feed pumps is a booster pump forming a pump for supplying fuel to the corresponding engine.

8. Rotorcraft equipment according to claim 1, wherein a pump of the power plant that is driven by at least one corresponding engine forms a fuel supply pump of said engine.

9. Rotorcraft equipment according to claim 1, wherein the common tank is formed by a single compartment housing both of the safe tanks, each included in a respective one of the assemblies.

10. Rotorcraft equipment according to claim 1, wherein:
   the common tank is made up from a plurality of compartments with free fluid-flow communication between one another; and
   at least one of any one of the compartments making up the common tank houses at least one safe tank included in at least one of the assemblies.

11. A rotorcraft fitted with a power plant including a plurality of engines that are fed with fuel from a fuel feed architecture according to claim 1.

12. A rotorcraft according to claim 11, wherein:
   each of the engines fitted to the rotorcraft is supplied with fuel independently from the safe tank that is respectively allocated thereto;
   the safe tanks are fed with fuel by means of feed circuits that are respectively specific thereto, from a common fuel tank; and
   the fuel feed circuit of a safe tank constitutes a fuel feed circuit of the other safe tank in the event of a failure of the feed circuit of said other safe tank, fuel being fed via the intercommunication that participates in the circuit for forced transfer of fuel from one of the assemblies including a respective one of the safe tanks to the other.

* * * * *